(12) United States Patent
Mechlin

(10) Patent No.: US 6,286,954 B1
(45) Date of Patent: Sep. 11, 2001

(54) EYEGLASS TEMPLE HAVING REMOVABLE SCREWDRIVER

(76) Inventor: Georgia Mechlin, 407 Carlisle Dr., Alexandria, VA (US) 22301

( * ) Notice: Subject to any disclaimer, the term of this patent is extended or adjusted under 35 U.S.C. 154(b) by 0 days.

(21) Appl. No.: 09/651,092

(22) Filed: Aug. 30, 2000

Related U.S. Application Data

(60) Provisional application No. 60/151,761, filed on Aug. 31, 1999.

(51) Int. Cl.[7] ........................................ G02C 5/14
(52) U.S. Cl. ............................ 351/111; 351/119; 351/158
(58) Field of Search .................................. 351/111, 116, 351/119, 158

(56) References Cited

U.S. PATENT DOCUMENTS

| | | | |
|---|---|---|---|
| 4,768,872 | * | 9/1988 | Fraselle et al. ........................ 351/118 |
| 5,223,861 | | 6/1993 | Wagner ................................. 351/158 |
| 6,120,146 | * | 9/2000 | Harris ................................... 351/158 |

* cited by examiner

*Primary Examiner*—Huy Mai
(74) *Attorney, Agent, or Firm*—Shoemaker and Mattare

(57) ABSTRACT

An eyeglass temple has a cavity containing a removable screwdriver whose handle is shaped to function as an earpiece portion of the temple when the screw driver shaft is housed within the temple. The screw driver can be removed when desired to tighten, for example, the hinge screws of the glasses.

15 Claims, 3 Drawing Sheets

EYEGLASS TEMPLE HAVING REMOVABLE SCREWDRIVER

This application claims priority from provisional patent application Ser. No. 60/151,761, filed Aug. 31, 1999.

BACKGROUND OF THE INVENTION

This invention relates to eyeglasses having a temple piece containing a removable screwdriver.

One of the recurring problems that a wearer of eyeglasses or sunglasses experiences is a loosening of the screws which either hold the temple to the frame of the glasses, or the screws which hold the lenses in the frame. To re-tighten loose screws, various compact screw driver kits are sold and carried separately; however, most glasses wearers do not carry such kits with them, and have to improvise when a screw driver when needed. Makeshift tools may damage the screw slots, and cannot deliver as much torque as a proper screwdriver.

Other inventors have proposed solutions to the problem described above. U.S. Pat. No. 5,223,861, for example, proposes using the end of the temple portion of an eyepiece as a screw driver. However, this arrangement requires the addition of a cumbersome end piece to the temple piece, and is uncomfortable as well.

SUMMARY OF THE INVENTION

An object of the invention is to modify the body of at least one temple of a pair of eyeglasses by providing it with a cavity adapted to receive a small screw driver formed at the forward end of the earpiece. This allows the screw driver to be hidden, without the need for having a specialized end piece which would be uncomfortable to the wearer.

Another object is to construct the temple cover (the piece that engages the ear) as the handle of the screw driver.

These and other objects are attained by an eyeglass temple having a cavity containing a removable screwdriver as exemplified in the drawings and described more fully below.

The term "eyeglasses" as used herein, is intended to encompass both prescription eyeglasses and non-prescription glasses, including sunglasses.

BRIEF DESCRIPTION OF THE DRAWINGS

In the accompanying drawings.

DESCRIPTION OF THE PREFERRED EMBODIMENT

Figure 1:
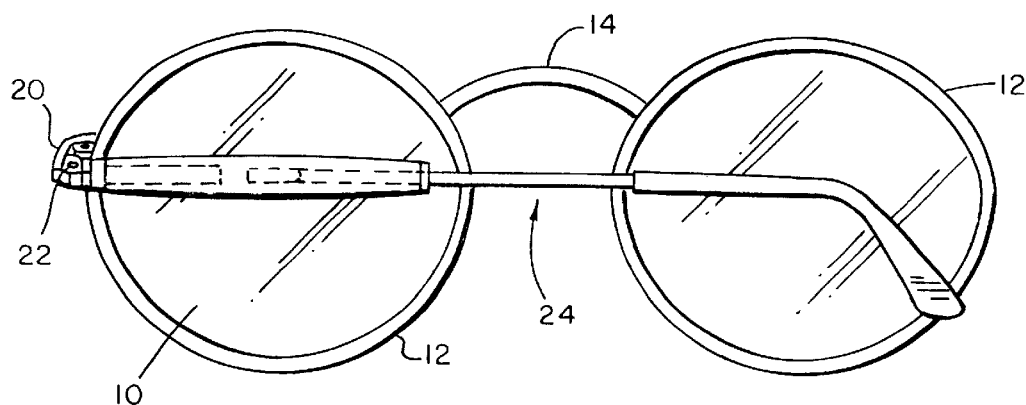
FIG. 1 is a rear view of a pair of eyeglasses, one of the temples being omitted for clarity.
Figure 2:
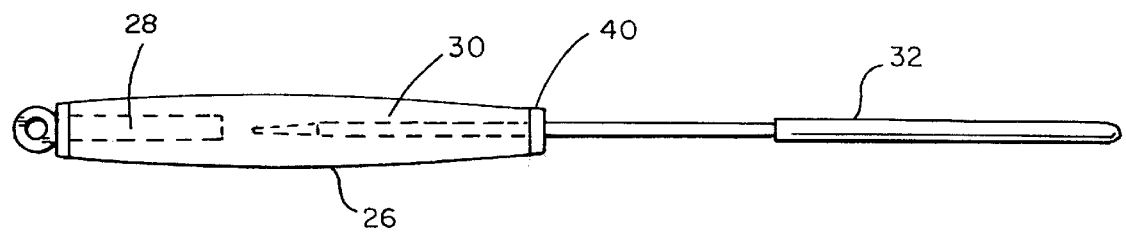
FIG. 2 is a top plan view of one temple, showing a screw driver retained in the temple.
Figure 3:
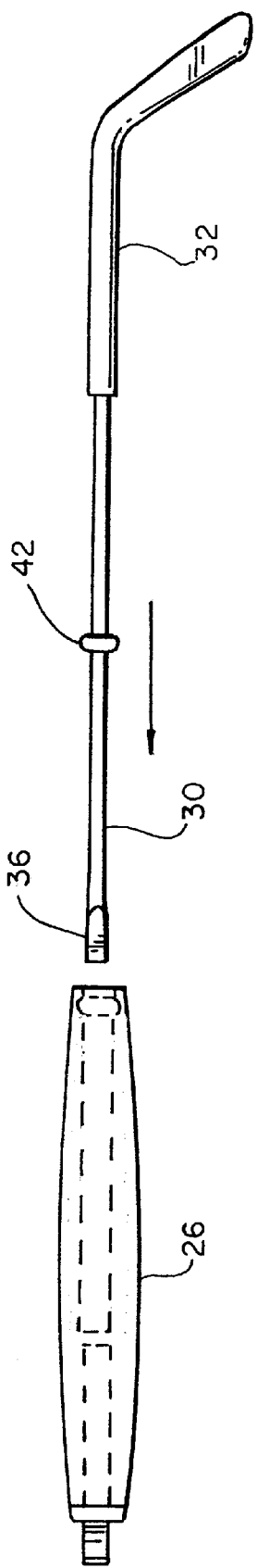
FIG. 3 is a side elevation of the temple, showing a slightly modified screw driver removed from the temple.
Figure 4:
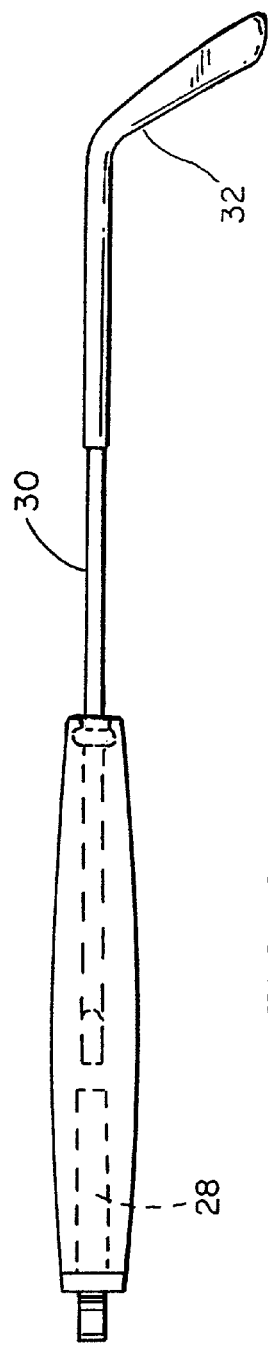
FIG. 4 is a view like FIG. 3, with the screw driver reinstalled within the temple.
Figure 5:
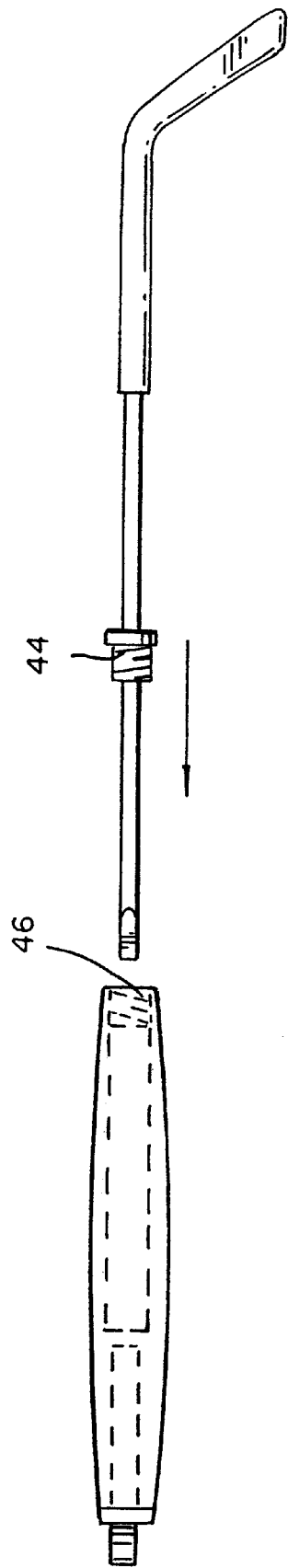
FIG. 5 is a view like FIG. 3, of a screw driver having a threaded connection with the temple body.

A pair of eyeglasses embodying the invention is shown in FIG. 1. The frame which holds the lenses 10 comprises a pair of eye wires 12, interconnected by a bridge 14. Nose pads (not shown) are supported on the respective eye wires. Each of the eye wires supports a hinge element 20 having a vertical pivot screw 22 upon which a temple piece 24 pivots. The pivoting hinge element 28 is a metal reinforcement which extends a short distance into the plastic body 26 of the temple.

The body 26 is hollow, being provided with a cavity 25, which is open at the rear of the body. As one can see in FIGS. 2–6, the cavity is adapted to house the distal end 30 of the ear piece stem, which according to this invention serves as a screw driver shaft. The ear piece (temple cover) is conventional, and serves as the handle of the screw driver.

The forward tip of the earpiece stem is shaped as a screwdriver bit 36. The bit illustrated is of the flat blade type, for a slot-type screw, alternatively, it could be a Phillips bit or some other configuration. I particularly contemplate providing a pair of glasses with two screw drivers having bits of different types (e.g., one slot-type blade and one Phillips bit, one in each temple).

Preferably, the body 26 and the temple cover 32 are made of "zyl" (zylonite), a cellulose acetate which is commonly used for temple portions. This helps camouflage the screw driver.

Figure 6:
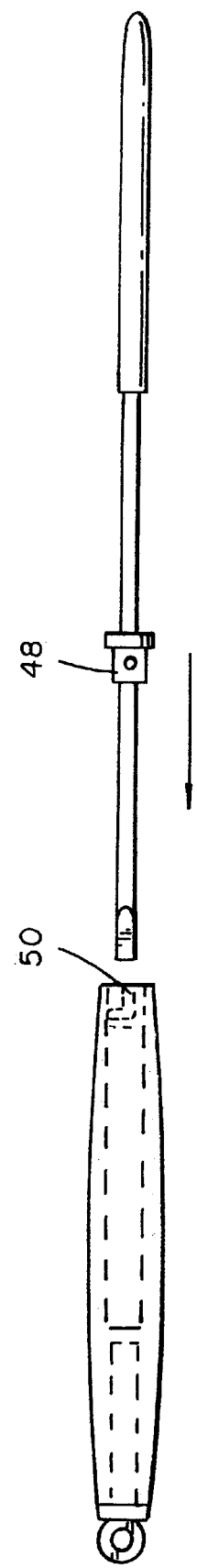
FIG. 6 is a view like FIG. 3, of a screw driver having a bayonet connection to the temple body.

The screw driver is retained within the cavity by a connection 40 which both holds it tightly enough that it does not work loose in ordinary use, and maintains the proper angular orientation of the ear piece, so that the temple cover remains comfortable. The connection can be simply a tight friction fit between the screw driver shaft and at least a portion of the walls of the cavity, as in FIG. 2, but I prefer a more positive connection: for example, a snap-connection (FIGS. 3–4), a screw-thread connection (FIG. 5), or a bayonet connection (FIG. 6). Other types of mechanical connections will occur to those of skill in the field of this invention.

A snap-connection can take various forms, for example a circumferential ridge 42 on one part engaging a detent groove on the other part when the screwdriver is fully inserted.

In the case of a screw thread arrangement (FIG. 5), a portion 44 of the shaft is threaded, so as to engage corresponding internal threads 46 formed on the walls of the cavity, or on a metal insert installed in the cavity. Likewise, a bayonet connection, or a similar partial-turn connection, may be provided, including a bayonet fitting 48 on the stem and a complementary socket 50 on the walls of the cavity, or on a metal insert within the cavity.

Whatever the constructional details, I prefer that from outward appearances the temple body and the screw driver handle appear to be integral and no different from a conventional temple. With any of the above constructions, the screwdriver(s) can be removed easily, when desired, to tighten the hinge screws, eye frame screws, or nose pad screws of the eyeglasses.

Although preferred embodiments of the invention are described and illustrated, it should be understood that the invention is not limited to the specific embodiments disclosed, but is capable of numerous rearrangements, modifications and substitutions.

I claim:

1. A temple piece for eyeglasses, said temple piece comprising
    a body having a hinge connection to a frame of the eyeglasses, and
    an earpiece having a stem attached to said body,
    said stem having a forward end formed as a bit for driving fasteners, said body having a cavity for receiving said forward end, and a releasable retaining arrangement for securing the stem within the cavity when the stem is disposed within the cavity, yet permitting its withdrawal so that the earpiece may be used as a tool.

2. The invention of claim 1, wherein the bit is a Phillips screwdriver bit.

3. The invention of claim 1, wherein the bit is a slot-type screwdriver bit.

4. The invention of claim 1, wherein the connection is provided by a friction push-fit between the stem and the body.

5. The invention of claim 1, wherein the connection comprises an enlargement on one of said stem and said body, and a recess on the other, resulting in a secure snap connection between the parts when they are pushed together.

6. The invention of claim 1, wherein the connection is a bayonet-type connection.

7. The invention of claim 1, wherein the connection is a helical thread connection.

8. In eyeglasses comprising a frame containing a pair of lenses, a pair of temple pieces, each comprising a body portion hinged to said frame, and an earpiece normally securely retained within the body portion, the improvement wherein at least one of said earpieces is removably retained in its respective body portion by a releasable retaining arrangement in such a way that the earpiece can be temporarily removed from its body and subsequently may be reinserted, and wherein a forward end of said removable earpiece is shaped in the form of a bit suitable for driving a fastener, so that the earpiece, when removed, can be used as a tool.

9. The invention of claim 8 wherein the bit is a Phillips screwdriver bit.

10. The invention of claim 8 wherein the bit is a slot-type screwdriver bit.

11. The invention of claim 8 wherein the connection is provided by a friction push-fit between the stem and the body.

12. The invention of claim 8 wherein the connection comprises an enlargement on one of said stem and said body, and a recess on the other, resulting in a secure snap connection between the parts when they are pushed together.

13. The invention of claim 8 wherein the connection is a bayonet-type connection.

14. The invention of claim 8 wherein the connection is a helical thread connection.

15. The invention of claim 8, wherein each of said temple pieces has a removable tool, said tools having bits of different types.

\* \* \* \* \*